Sept. 13, 1932.  J. MATTMANN  1,877,345
COOLING WATER REGULATOR FOR ROTARY COMPRESSORS
Filed Oct. 10, 1929
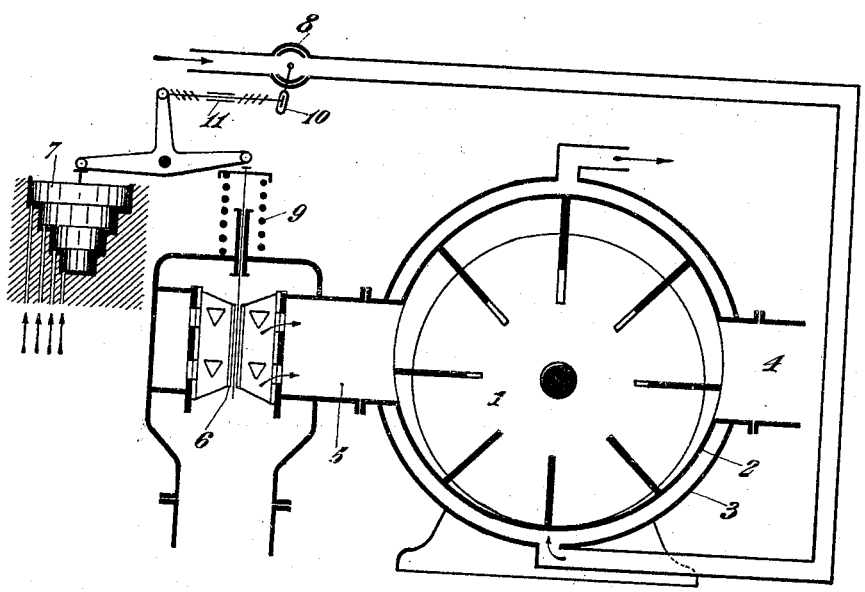
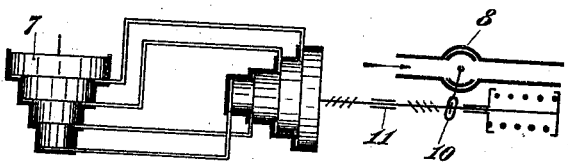
Josef Mattmann
INVENTOR;

Patented Sept. 13, 1932

1,877,345

UNITED STATES PATENT OFFICE

JOSEF MATTMANN, OF WINTERTHUR, SWITZERLAND, ASSIGNOR TO SWISS LOCOMOTIVE AND MACHINE WORKS, OF WINTERTHUR, SWITZERLAND, A CORPORATION OF SWITZERLAND

COOLING WATER REGULATOR FOR ROTARY COMPRESSORS

Application filed October 10, 1929, Serial No. 398,737, and in Germany October 31, 1928.

This invention relates to methods of and devices for regulating the cooling water supplied to rotary compressors.

The regulation of the output of a rotary compressor for maintaining constant the working pressure is effected, as is known, by partly or completely closing the suction pipe by means of a throttle valve. The machine is cooled during such regulation in consequence of the reduction of the work of compression, but the water-cooled stator or housing experiences a more rapid fall in temperature then the uncooled rotor. As the axial play between the ends of the rotor and those of the stator end plates or covers must be reduced to a minimum at the normal working temperature in order to obtain a good volumetric efficiency of the machine, there is the danger when not regulating the amount of water supplied for cooling the machine that the rotor bears against the end covers and thereby damages the compressor and under some circumstances puts it out of commission.

The present invention has for its object to prevent such contact of the rotor with the covers by maintaining constant the amount of play between those parts.

This end is attained by regulating the stator temperature and indirectly the rotor temperature by varying the water-cooling of the stator in dependence on the compression work to be performed by the machine or on the volume of compressed medium supplied by it.

The invention also provides a device for performing such regulation comprising a regulating member that is built into the water-supply pipe for regulating the quantity of cooling water, and is controlled by the throttle valve of the compressor.

According to a feature of the invention, the rod for shifting the regulating member is variable in length for enabling the closure position of the regulating member to be exactly determined and fixed.

Conveniently, the said regulating rod is connected one end to a link which enables the regulating member to be positioned exactly in relation to the throttle valve of the compressor.

Further, according to the invention the throttle valve may be coupled with the said regulating member either mechanically or pneumatically.

Two embodiments of the invention are diagrammatically illustrated by way of example in the accompanying drawing, wherein:—

Figure 1 shows one form of regulating device according to the invention comprising a mechanical coupling, and Figure 2 shows a pneumatic coupling.

In the drawing, 1 denotes the rotor of a rotary compressor, 2 is the stator or housing, 3 the water jacket, 4 the pressure conduit, 5 the suction conduit, 6 a throttle valve in the suction conduit, 7 a compressed air piston for operating the valve 6, 8 is a regulating member for the cooling water, 9 is a spring tending to seat the valve 6 and 10 is an adjustable link to which is connected one end of a spindle 11 of variable length for setting the regulating member 8. The piston 7 is controlled in known manner by a controlling device not shown.

When the desired working pressure is obtained in the pressure conduit 4 the piston 7 completely or partially closes the valve 6 according to the consumption of compressed air at the time. The valve can be closed partially owing to the piston 7 being formed as a differential piston or, when an ordinary piston is employed, by automatically varying the tension of the spring 9.

The movement of the valve 6 is transmitted to a regulating member or valve 8 provided in the water-supply pipe of the compressor, the coupling between the valves 6 and 8 being either mechanical, as shown in Figure 1, or pneumatic, as shown in Figure 2. A turnbuckle in the rod 11, and the link 10 permit both the closing position of the valve 8 and also the amount the valve opens to be exactly regulated according to the movements of the throttle valve 6. To each position of the valve 6 there belongs a predetermined position of the regulating member 8, and to each output per volume of the compressor a predetermined quantity of cooling water.

I claim:—

1. A device for regulating the quantity of cooling water of a rotary compressor controlled by a throttle valve operated from a compressed air regulator, comprising in combination a regulating member in the pipe supplying cooling water to the compressor, and adjustable means operatively connecting said member with said valve and air regulator to cause the closure position of said member to be exactly regulated.

2. A device for regulating the quantity of cooling water of a rotary compressor controlled by a throttle valve operated from a compressed air regulator, comprising in combination a regulating member for controlling the supply of cooling water to the compressor, and an adjustable linkage operatively connecting said member with said air regulator and said valve to cause said member to be exactly adjusted with relation to the valve.

3. The combination of a water cooled, rotary compressor having a throttle valve operated by a compressed air regulator, a member arranged to control the supply of cooling water, and means operatively connecting said member, throttle valve and compressed air regulator whereby each position of said member corresponds to a definite position of said throttle valve and compressed air regulator.

Signed at Zurich, this 25th day of September, 1929.

JOSEF MATTMANN.